United States Patent
Odaka et al.

(10) Patent No.: US 9,692,969 B2
(45) Date of Patent: Jun. 27, 2017

(54) LENS APPARATUS, IMAGE CAPTURING APPARATUS, METHOD OF CONTROLLING CAMERA SYSTEM, AND STORAGE MEDIUM

(71) Applicant: CANON KABUSHIKI KAISHA, Tokyo (JP)

(72) Inventors: Yukio Odaka, Kawasaki (JP); Tomokazu Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 14/658,735

(22) Filed: Mar. 16, 2015

(65) Prior Publication Data
US 2015/0268441 A1 Sep. 24, 2015

(30) Foreign Application Priority Data
Mar. 18, 2014 (JP) .................................. 2014-055616

(51) Int. Cl.
H04N 5/232 (2006.01)
G03B 13/36 (2006.01)
G02B 7/36 (2006.01)

(52) U.S. Cl.
CPC ........... H04N 5/23245 (2013.01); G02B 7/36 (2013.01); G03B 13/36 (2013.01); H04N 5/23212 (2013.01)

(58) Field of Classification Search
None
See application file for complete search history.

(56) References Cited

U.S. PATENT DOCUMENTS

| 5,933,661 | A * | 8/1999 | Kawanami | G03B 5/00 396/135 |
| 2003/0169457 | A1* | 9/2003 | Yasuda | H04N 5/23212 358/302 |
| 2004/0057714 | A1* | 3/2004 | Kashiwaba | G03B 13/36 396/135 |
| 2008/0007644 | A1* | 1/2008 | Matsumoto | H04N 5/23209 348/345 |
| 2008/0084497 | A1* | 4/2008 | Sasaki | G02B 7/282 348/353 |
| 2010/0085470 | A1* | 4/2010 | Tsubusaki | H04N 5/23212 348/345 |
| 2011/0261251 | A1* | 10/2011 | Okamoto | G02B 7/102 348/345 |
| 2011/0267706 | A1* | 11/2011 | Karasawa | H04N 5/23212 359/698 |

(Continued)

FOREIGN PATENT DOCUMENTS

JP 2009-128611 A 6/2009

*Primary Examiner* — Twyler Haskins
*Assistant Examiner* — Wesley Chiu
(74) *Attorney, Agent, or Firm* — Cowan, Liebowitz & Latman, P.C.

(57) ABSTRACT

A lens apparatus, which is communicatable with an image capturing apparatus and includes a lens, comprises a communication unit configured to receive information concerning a driving amount of the lens which is used to move the lens to a focus position, and a controller having a first mode and a second mode of controlling the lens, wherein the controller selects one of the first mode and the second mode based on the received information, and wherein the controller decelerates the lens in the first mode slower than in the second mode.

12 Claims, 10 Drawing Sheets

(56) References Cited

U.S. PATENT DOCUMENTS

| | | | | |
|---|---|---|---|---|
| 2013/0120645 A1* | 5/2013 | Uenishi | ............ | H04N 5/23212 348/353 |
| 2013/0308039 A1* | 11/2013 | Uchiyama | .......... | H04N 5/23212 348/345 |
| 2015/0042868 A1* | 2/2015 | Ono | ..................... | G03B 13/36 348/349 |

* cited by examiner

FIG. 3

| COMMAND: LENS DRIVING | | | |
|---|---|---|---|
| | COMMAND | DATA 1 | DATA 2 |
| CAMERA TRANSMISSION DATA (CAMERA → LENS) | 10 | DRIVING AMOUNT (HIGH ORDER) | DRIVING AMOUNT (LOW ORDER) |
| CAMERA RECEPTION DATA (LENS → CAMERA) | XX | 10 | 10 |

| COMMAND: STOP DRIVING | | | |
|---|---|---|---|
| | COMMAND | DATA 1 | DATA 2 |
| CAMERA TRANSMISSION DATA (CAMERA → LENS) | 20 | DRIVING AMOUNT | 00 |
| CAMERA RECEPTION DATA (LENS → CAMERA) | XX | 20 | DRIVING PREDICTION TIME |

| COMMAND: IS CONTROL | | | |
|---|---|---|---|
| | COMMAND | DATA 1 | DATA 2 |
| CAMERA TRANSMISSION DATA (CAMERA → LENS) | 30 | 00:SW1 OFF<br>01:SW1 ON<br>02: MIRROR-UP<br>03:EXPOSURE | 00 |
| CAMERA RECEPTION DATA (LENS → CAMERA) | XX | 30 | 30 |

| STOP DRIVING TIME | |
|---|---|
| STOP DOWN COUNT | STOP DRIVING TIME |
| FIRST STAGE | 50ms |
| SECOND STAGE | 60ms |
| THIRD STAGE | 70ms |

LENS APPARATUS, IMAGE CAPTURING APPARATUS, METHOD OF CONTROLLING CAMERA SYSTEM, AND STORAGE MEDIUM

BACKGROUND OF THE INVENTION

Field of the Invention

The present invention relates to a technique of driving a lens in a camera system such as a single-lens reflex type digital camera.

Description of the Related Art

Control methods in automatic focus adjustment for image capturing apparatuses are roughly classified into two types. One method is a ONE-SHOT method of shooting a still object, and performing focus lock after focusing by an AF operation. The other method is an AI-SERVO method of shooting a moving object and continuing focus detection periodically and lens driving as needed unless the AF operation is completely turned off.

In general, an AF lens is focused by causing a motor to drive the focus lens. Conventionally, when driving a focus lens, there is a tradeoff relationship between a position stop accuracy and a driving time. That is, when priority is given to the stop position accuracy, the driving time increases, whereas when priority is given to the driving time, the stop position accuracy deteriorates. However, a current camera allows setting of only the driving amount and driving speed of the focus lens.

In a ONE-SHOT operation, higher priority should be given to a stop position accuracy than a driving time unless the shutter has been pressed, because a user presses the shutter upon checking an in-focus state. In an AI-SERVO operation, higher priority should be given to a driving time than a stop position accuracy if the focus lens cannot be driven within a predetermined time in the process of following a moving object.

Japanese Patent Laid-Open No. 2009-128611 discloses a camera which performs moving object prediction control, characterized by comprising a lens driving period prolongation means for setting a predetermined prolonged time if a focus adjustment lens position does not reach a drive target position and lens driving does not stop within the lens driving initial period and a moving object re-prediction computation means, wherein a lens control means controls driving of a focus adjustment lens at a target position calculated by the moving object re-prediction computation means when a driving period is prolonged.

If, however, only the driving amount and driving speed of the focus lens can be set in the camera, the camera cannot know when driving is complete, and cannot hence meet the requirements of the ONE-SHOT mode and the AI-SERVO mode. FIG. 13 graphically represents this state.

In addition, the related art disclosed in Japanese Patent Laid-Open No. 2009-128611 has a problem that the frame rate decreases more and more, and the marginal performance deteriorates.

SUMMARY OF THE INVENTION

The present invention has been made in consideration of the above problem and provides a lens apparatus which can implement optimal driving control on a focus lens for each of the ONE-SHOT mode and the AI-SERVO mode.

According to the first aspect of the present invention, there is provided a lens apparatus which is communicatable with an image capturing apparatus and includes a lens, the apparatus comprising: a communication unit configured to receive information concerning a driving amount of the lens which is used to move the lens to a focus position; and a controller having a first mode and a second mode of controlling the lens, wherein the controller selects one of the first mode and the second mode based on the received information, and wherein the controller decelerates the lens in the first mode slower than in the second mode.

According to the second aspect of the present invention, there is provided an image capturing apparatus which is communicatable with a lens apparatus including a lens and includes an image capturing unit, the image capturing apparatus comprising: a communication unit configured to transmit information concerning a driving amount of the lens which is used to move the lens to a focus position, wherein a controller of the lens apparatus has a first mode and a second mode of controlling the lens, wherein the controller selects one of the first mode and the second mode based on the received information, and wherein the controller decelerates the lens in the first mode slower than in the second mode.

According to the third aspect of the present invention, there is provided a method of controlling a camera system formed by attaching a lens which forms an object image to a camera, the method comprising: a communication step of communicating, to the lens, a driving amount of a focus lens by which a focus position of the lens is adjusted; a determination step of determining whether a target position to be focused has changed in chronological order; and a control step of controlling driving of the focus lens with higher priority being given to a stop position accuracy of the focus lens when the target position has not changed in chronological order and controlling driving of the focus lens with higher priority being given to a driving speed of the focus lens when the target position has changed in chronological order.

Further features of the present invention will become apparent from the following description of exemplary embodiments with reference to the attached drawings.

BRIEF DESCRIPTION OF THE DRAWINGS

FIG. 3 is a view showing lens communication definitions;

DESCRIPTION OF THE EMBODIMENTS

An embodiment of the present invention will be described below in detail with reference to the accompanying drawings. As has been described above, the control methods in automatic focus adjustment for image capturing apparatuses are roughly classified into two types. One method is to shoot a still object and perform focus lock after focusing by an AF operation. In this embodiment, this method is called a "ONE-SHOT" mode. The other method is to shoot a moving object and continue focus detection periodically and lens driving as needed unless an AF operation is completely turned off. In the embodiment, this method is called an "AI-SERVO mode".

Figure 1:
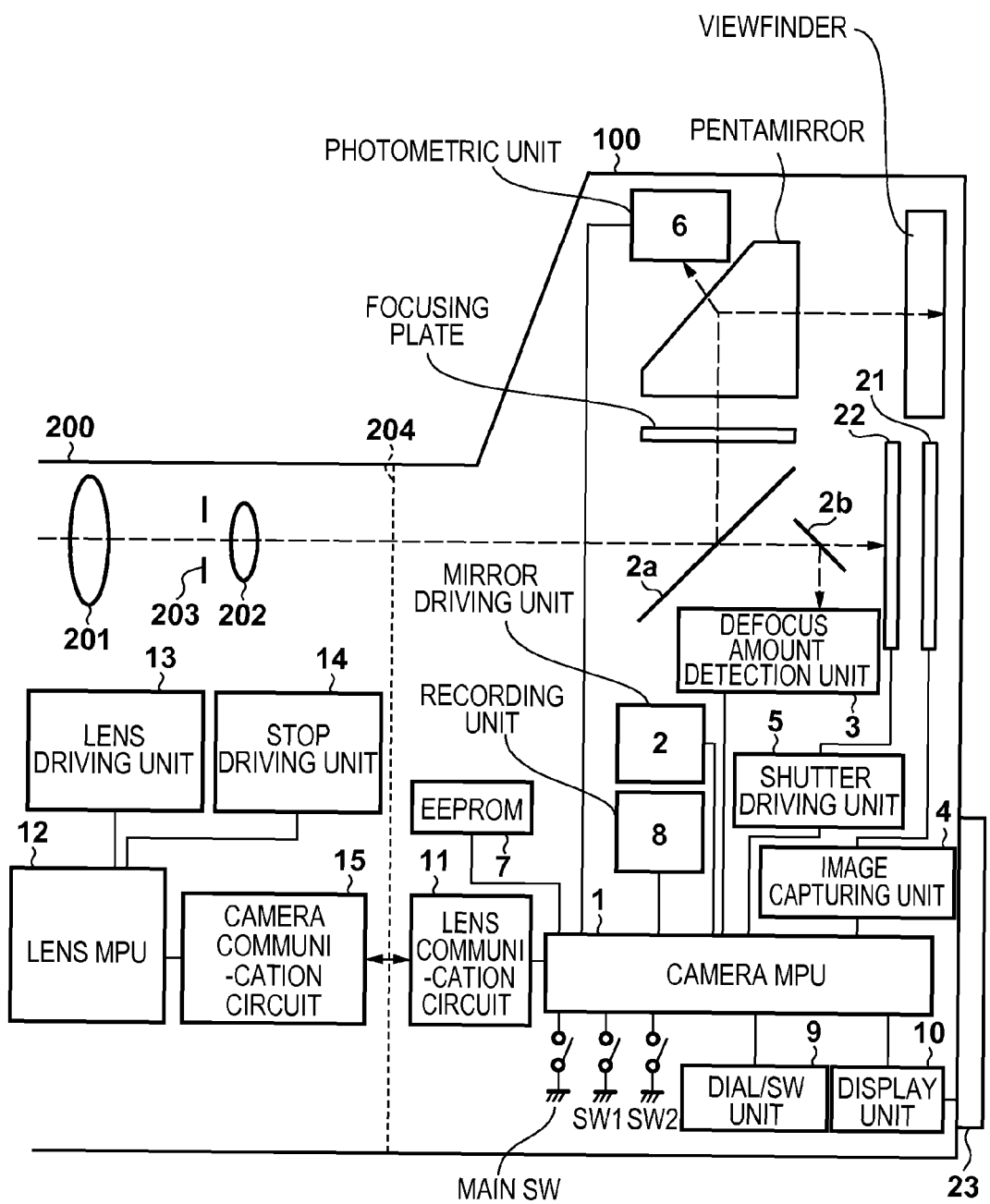
FIG. 1 is a block diagram showing the arrangement of a camera system according to an embodiment of the present invention.

FIG. 1 shows the arrangement of a camera system according to an embodiment of an image capturing apparatus of the present invention. Referring to FIG. 1, a camera MPU 1 controls the overall camera. The camera MPU 1 incorporates a memory which stores programs for controlling the camera. A mirror driving unit 2 drives a main mirror 2a and a sub-mirror 2b in accordance with instructions from the camera MPU 1.

A defocus amount detection unit 3 which receives light reflected by the sub-mirror 2b detects a defocus amount. An image capturing unit 4 controls overall shooting operations in accordance with instructions from the camera MPU 1. A shutter driving unit 5 drives a shutter 22 in accordance with an instruction from the camera MPU 1. A photometric unit 6 detects the brightness of an object. An EEPROM 7 stores various types of parameters required for controlling the camera.

A recording unit 8 records the image shot by an image sensor 21 in accordance with an instruction from the camera MPU 1. A dial/SW unit 9 serves as an operation member with which the operator issues instructions to the camera. A display unit 10 displays, on a display panel 23, a shot image, its image information, various types of information of the camera, camera setting information, and the like. A lens communication circuit 11 is a circuit for communication with the lens.

A lens MPU 12 controls a lens 200. The lens MPU 12 incorporates a memory which stores programs for controlling the lens 200. A lens group 201 forms an object image. A focus lens 202 focuses on the image sensor 21. Note that the lens group 201 is expressed by one lens for convenience sake but is actually constituted by a plurality of lenses or a lens group. In addition, the focus lens 202 is expressed by one lens but may be configured to move a focus position in cooperation with a plurality of lenses. In this case, the position of the focus lens indicates the focus position achieved in cooperation with a plurality of lenses. A lens driving unit 13 controls driving of the lens group 201 and focus lens 202 in accordance with instructions from the lens MPU 12. A stop driving unit 14 controls driving of a stop 203 in accordance with an instruction from the lens MPU 12. A camera communication circuit 15 is used for communication with the camera.

The lens 200 is attached to a camera 100 via a mount 204 to make various types of information communicatable between the camera MPU 1 and the lens MPU 12.

Figure 2A:
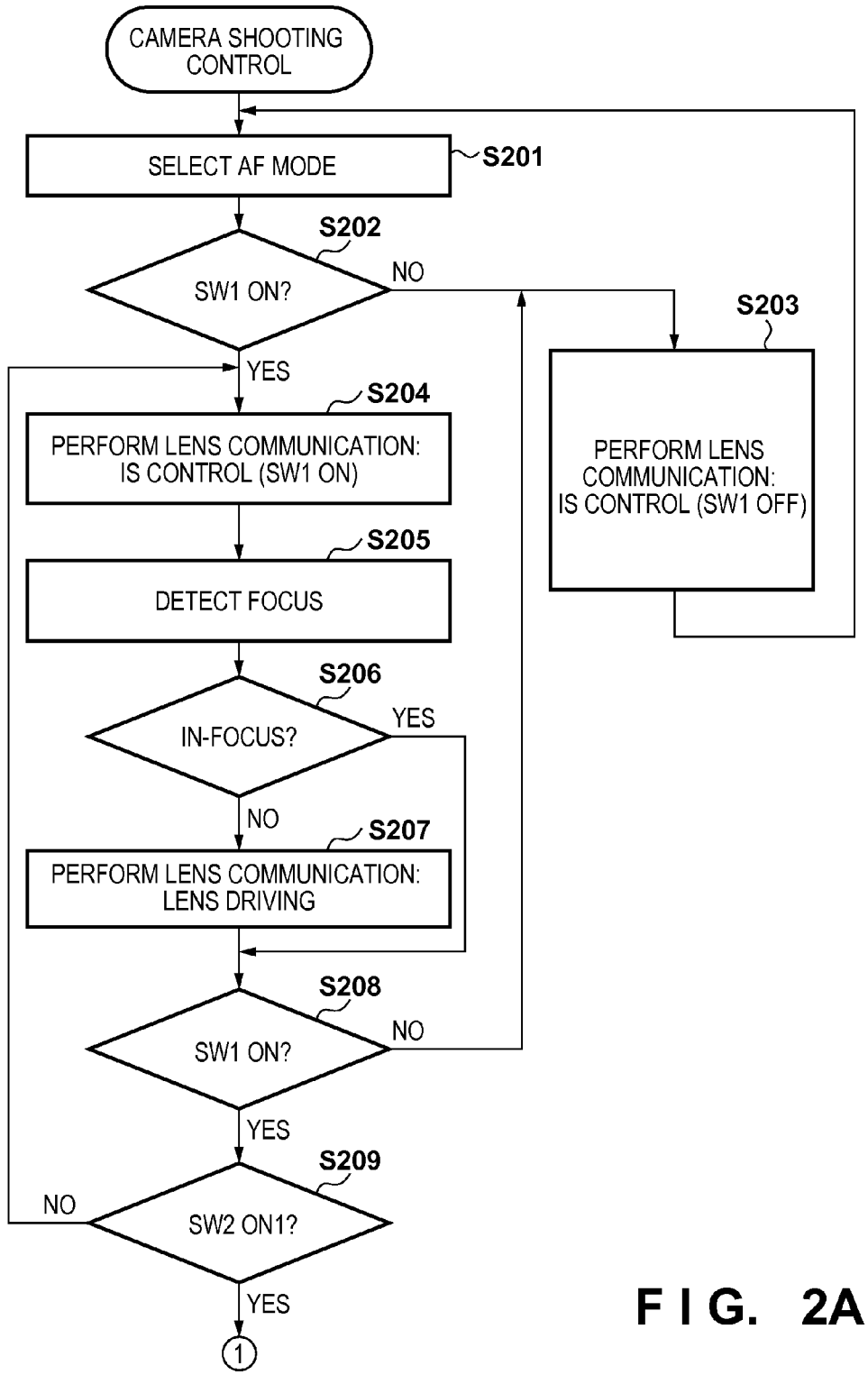
FIGS. 2A and 2B are flowcharts showing a shooting control method on the camera side according to an embodiment.
Figure 2B:
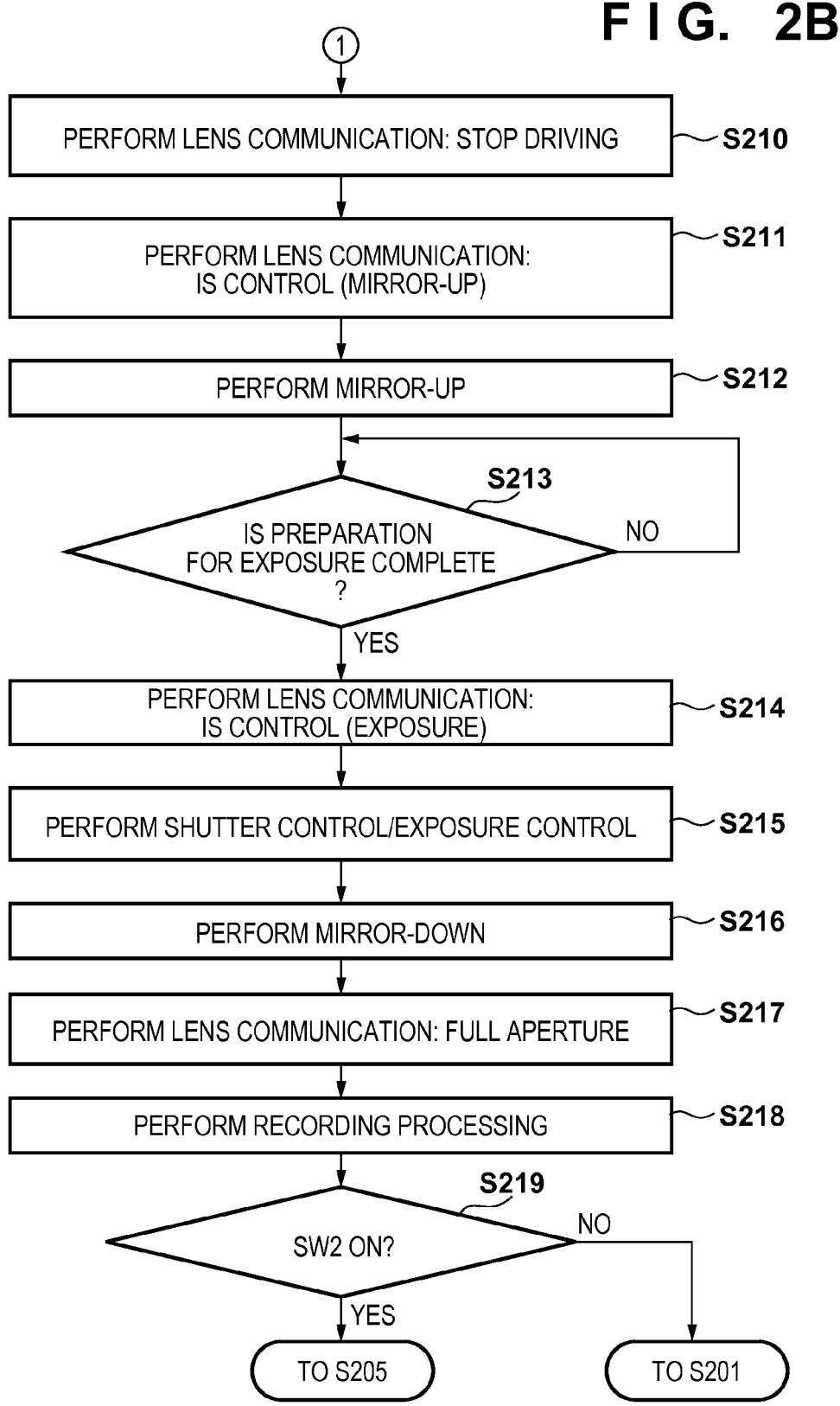

FIGS. 2A and 2B are flowcharts showing a procedure for shooting processing according to an embodiment.

In step S201, an AF (Auto Focus) mode is selected by using the operation member of the dial/SW unit 9. When the operator of the camera skips step S201, the camera operates according to the AF mode setting determined in advance at the power-on of the camera.

In step S202, the state of a switch SW1 is determined, which is turned on when the release button of the camera is pressed halfway. If the switch SW1 is on, the process advances to step S204; otherwise, the process advances to step S203. In step S203, lens communication of "command: IS control" is performed.

FIG. 3 shows the definitions of communication (lens communication) between the camera 100 and the lens 200. If the content of data 1 sent from the camera 100 to the lens 200 is 00, the switch SW1 of the camera is in the OFF state. If the content is 01, the switch SW1 of the camera is in the ON state. If the content is 02, the camera is in the mirror-up state. If the content is 03, the camera is in the exposure state. In step S203, communication is performed to indicate that the camera is in the SW1 OFF state. The process then returns to step S201.

In step S204, lens communication of "command: IS control" is performed. The lens communication definitions have already been described above with reference to FIG. 3. In step S204, communication is performed to indicate that the camera is in the SW1 ON state.

In step S205, focus detection processing is performed by using the defocus amount detection unit 3. In step S206, it is determined based on the output obtained by the above focus detection processing. If an in-focus state is determined, the process advances to step S208; otherwise, the process advances to step S207.

In step S207, lens communication of "command: lens driving" is performed for focus lens driving by a defocus amount based on the output obtained by the above focus detection processing. FIG. 3 shows the lens communication definitions. The camera 100 transfers a lens driving amount to the lens 200.

In step S208, the state of the switch SW1 of the camera 100 is determined. If the switch SW1 is on, the process advances to step S209; otherwise, the process returns to step S203. In step S209, the state of a switch SW2 is determined, which is turned on when the release button of the camera 100 is pressed fully. If the switch SW2 is on, the process advances to step S210; otherwise, the process returns to step S204.

In step S210, lens communication of "command: stop driving" is performed to drive the stop 203. FIG. 3 shows the lens communication definitions. The camera 100 transfers the driving amount of the stop 203 to the lens 200. In addition, the 200 returns the prediction time required for stop driving.

In step S211, lens communication of "command: IS control" is performed. The lens communication definitions have already been described above with reference to FIG. 3. In step S211, communication is performed to indicate that the camera 100 is in the mirror-up state.

In step S212, the mirror-up operation of the main mirror 2a is performed by using the mirror driving unit 2. In step S213, a standby state is set until exposure preparation is complete. The completion of exposure preparation means that both a mirror-up operation and stop driving are complete.

In step S214, lens communication of "command: IS control" is performed. The lens communication definitions have already been described above with reference to FIG. 3. In step S214, communication is performed to indicate that the camera is ready to start exposure.

In step S215, the shutter driving unit 5 controls the shutter 22. In addition, the image capturing unit 4 reads image data from the image sensor 21 and starts developing processing and the like for the data.

In step S216, the mirror driving unit 2 performs the mirror-down operation of the main mirror 2a. In step S217, lens communication of "command: stop driving" is performed to drive the stop 203. FIG. 3 shows the lens communication definitions. A driving amount by which the stop 203 is driven to fully open is transferred to the lens 200. In addition, the lens 200 returns the prediction time required for stop driving.

In step S218, the image capturing unit 4 and the recording unit 8 perform recording processing. In step S219, the state of the switch SW2 of the camera 100 is determined. If the switch SW2 is on, the process returns to step S205; otherwise, the process returns to step S201. With the above operation, a series of shooting processing is terminated.

Figure 4:
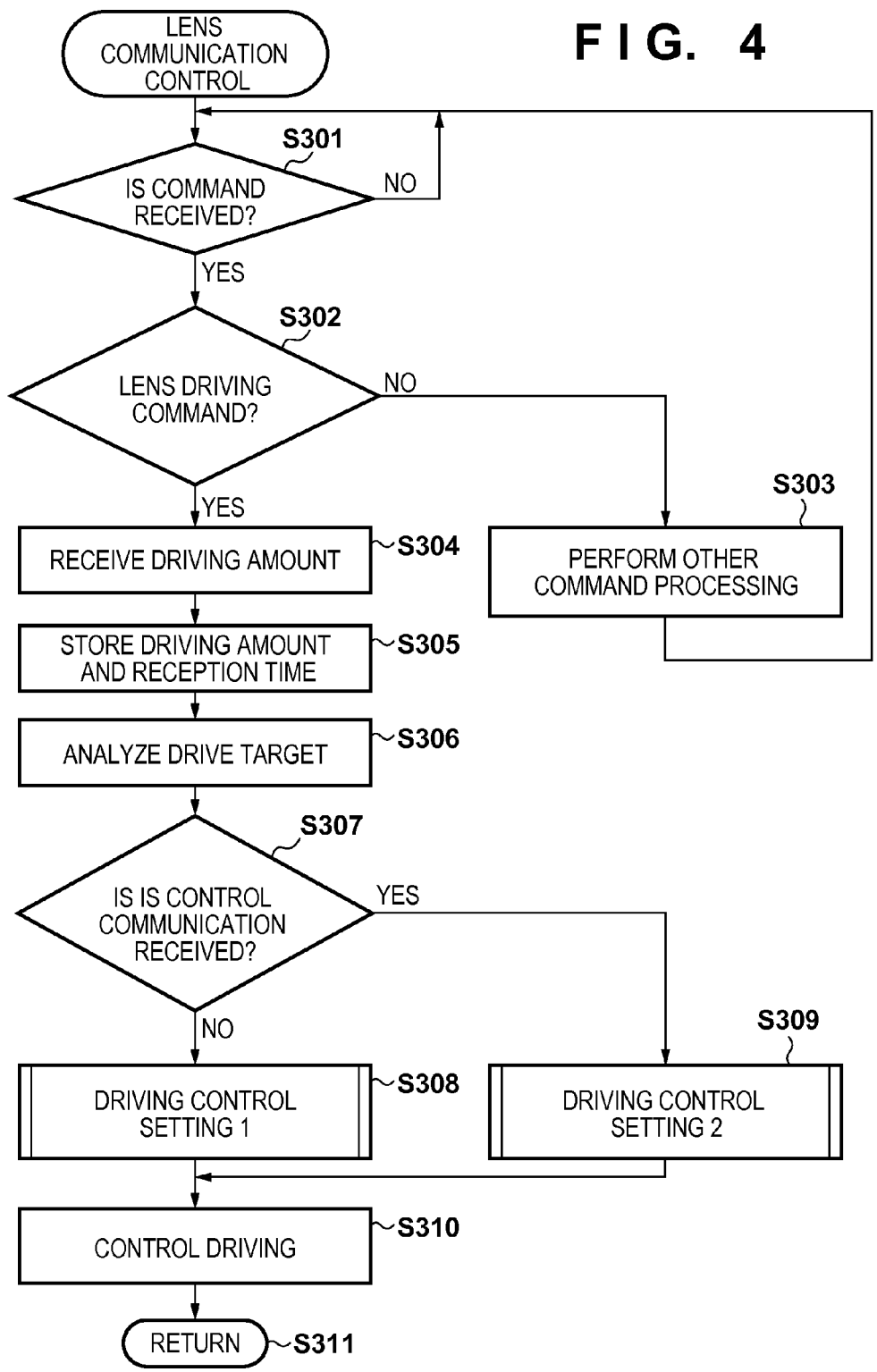
FIG. 4 is a flowchart showing a communication control method on the lens side according to an embodiment.

FIG. 4 is a flowchart showing a procedure for lens communication control according to an embodiment.

In step S301, a standby state is set until a command is received from the camera 100. In step S302, the received command is determined. If the received command is to communicate a lens driving amount, the process advances to step S304; otherwise, the process advances to step S303. In step S303, lens communication processing corresponding to the command is performed. The process then returns to step S301.

In step S304, a lens driving amount is received from the camera 100. In step S305, the lens driving amount and the reception time are stored. In step S306, a drive target is analyzed. The analysis of the drive target will be described in detail.

Figure 5:
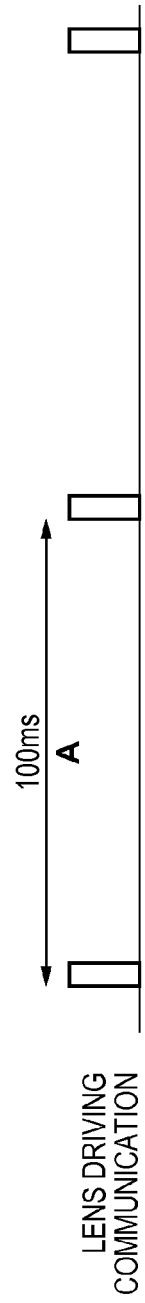
FIG. 5 is a view for explaining lens communication while SW1 of a camera is in the ON state.

FIG. 5 shows the state of lens communication while the camera is in the SW1 ON state. While the SW1 of the camera is in the ON state, a focus detection operation is performed in a predetermined cycle. For this reason, the driving permissible time of the focus lens 202, that is, the time during which lens driving can be performed, can be calculated by measuring a transmission cycle (A in FIG. 5) of the lens driving instruction transmitted from the camera.

Figure 6:
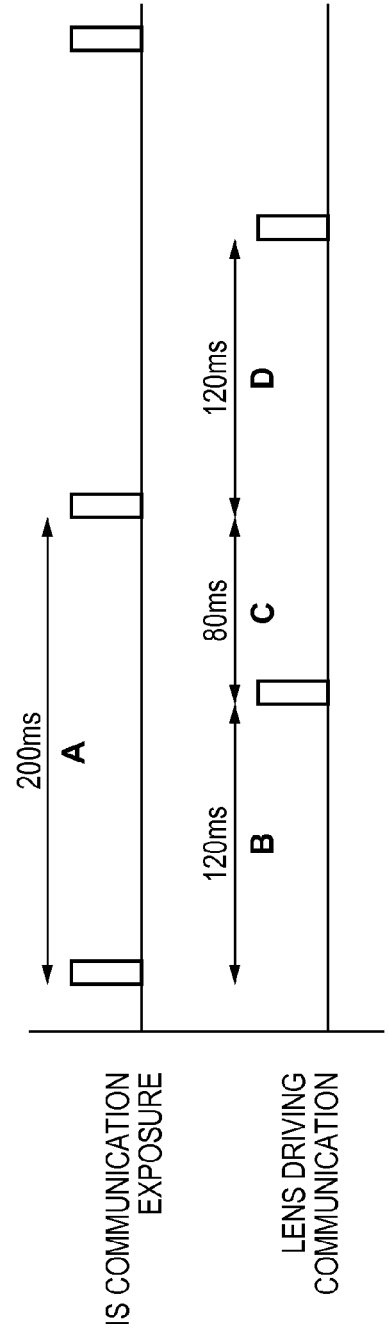
FIG. 6 is a view for explaining lens communication during continuous shooting of the camera.

FIG. 6 shows the state of lens communication while the camera is in a state of continuous shooting. While the camera is in a state of continuous shooting, IS control communication (exposure) and lens driving communication (request communication) occur at a predetermined timing. A frame rate can be calculated by measuring the communication cycle (A in FIG. 6) of this IS control communication (exposure).

In addition, the driving permissible time of the focus lens 202 during continuous shooting can be calculated by measuring the time (C in FIG. 6) from lens driving communication to IS communication (exposure). At the first frame in continuous shooting, it is possible to calculate the driving permissible time of the focus lens 202 from the time required for stop driving instructed by the stop driving instruction transmitted from the camera 100 in step S210 described above.

Figures 7, 8:
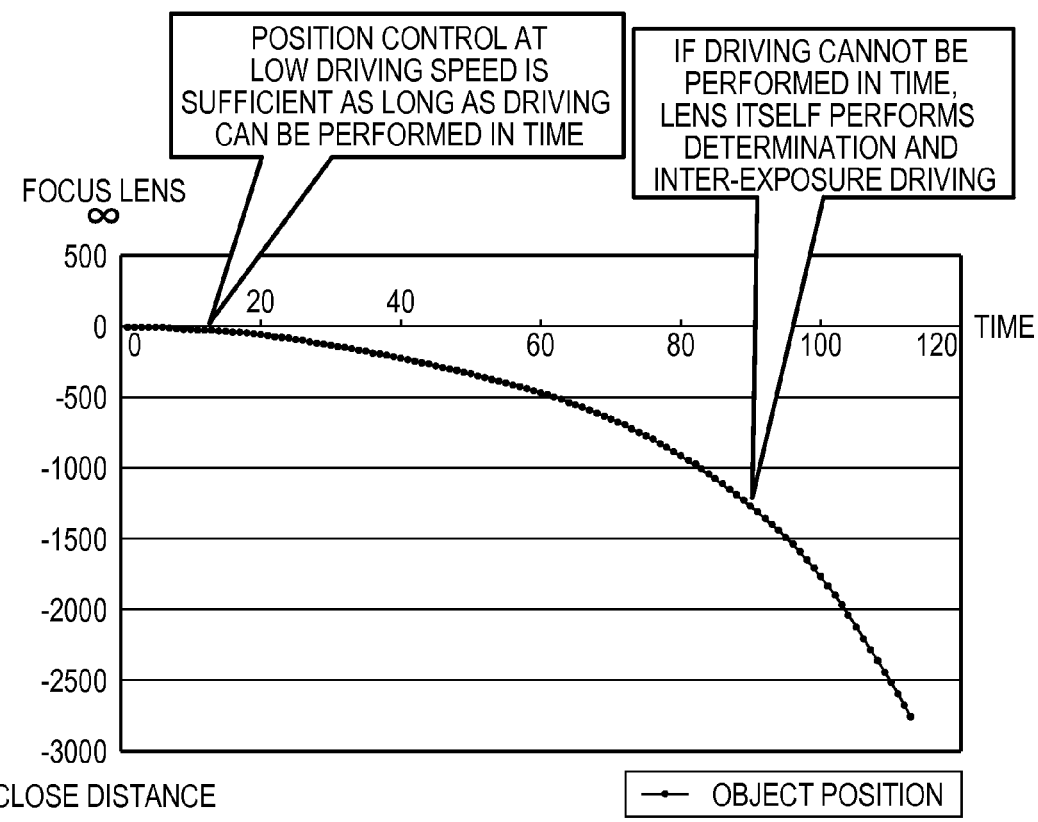
FIG. 7 is a view for explaining a stop driving time.
FIG. 8 is a graph for explaining a lens driving method according to an embodiment.

FIG. 7 shows stop driving times. A stop driving time changes in accordance with the stop down count. Since exposure starts after the completion of stop driving, the stop driving time can be calculated as the driving permissible time of the focus lens 202.

Calculating the driving permissible time of the focus lens 202 in the above manner allows the lens 200 to determine by itself whether the driving permissible time of the focus lens 202 can be satisfied by the lens driving amount transmitted from the camera.

In addition, FIG. 8 is a graph showing the times and the positions of the focus lens 202 when an object approaches from a remote position at a constant speed. Obviously, while the object is remote, a change in distance ring position (lens driving amount) is small in a predetermined time, whereas as the object approaches, a change in the position of the focus lens (lens driving amount) is large in a predetermined time. If, for example, the driving amount of the focus lens increases as the object approaches and fails to satisfy the driving permissible time of the focus lens, the lens itself can perform determination and switch driving control.

Referring back to FIG. 4, in step S307, it is determined whether IS control communication has been received. If IS control communication has been received, the process advances to step S308; otherwise, the process advances to step S309.

In step S308, processing for driving control setting 1 is performed. Processing for driving control setting 1 will be described later. In step S309, processing for driving control setting 2 is performed. The processing for driving control setting 2 will be described later.

In step S310, the driving of the lens is controlled in accordance with the driving control set by driving control setting 1 or driving control setting 2 described above. In step S311, the processing for lens communication control is terminated.

Figure 9:
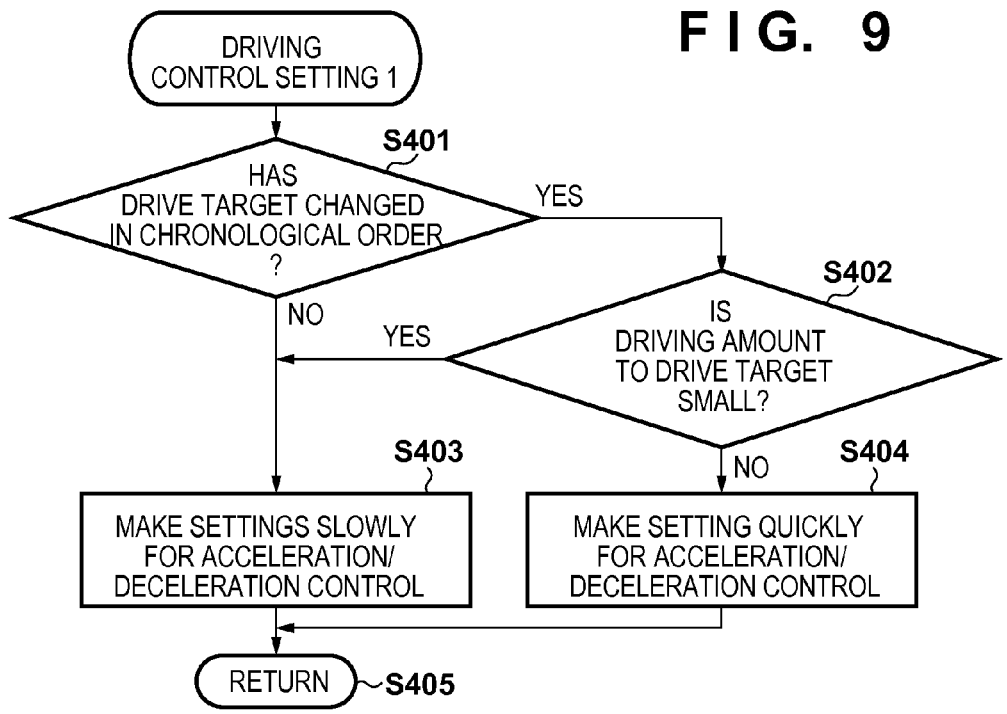
FIG. 9 is a flowchart showing settings in lens driving control on the lens side.

FIG. 9 is a flowchart showing a procedure for driving control setting 1 according to an embodiment of the present invention.

In step S401, it is determined whether the drive target position changes in chronological order. If the drive target position changes in chronological order, the process advances to step S402; otherwise, the process advances to step S403.

In step S402, the driving amount of the focus lens up to a drive target is determined. If the driving amount is smaller than a predetermined value, the process advances to step S403; otherwise, the process advances to step S404. In step S403, settings are made slowly for acceleration/deceleration control on the focus lens. In step S404, settings are made quicker for acceleration/deceleration control on the focus lens than when the driving amount is smaller than the predetermined value. In step S405, the processing for driving control setting 1 is terminated.

Figure 10:
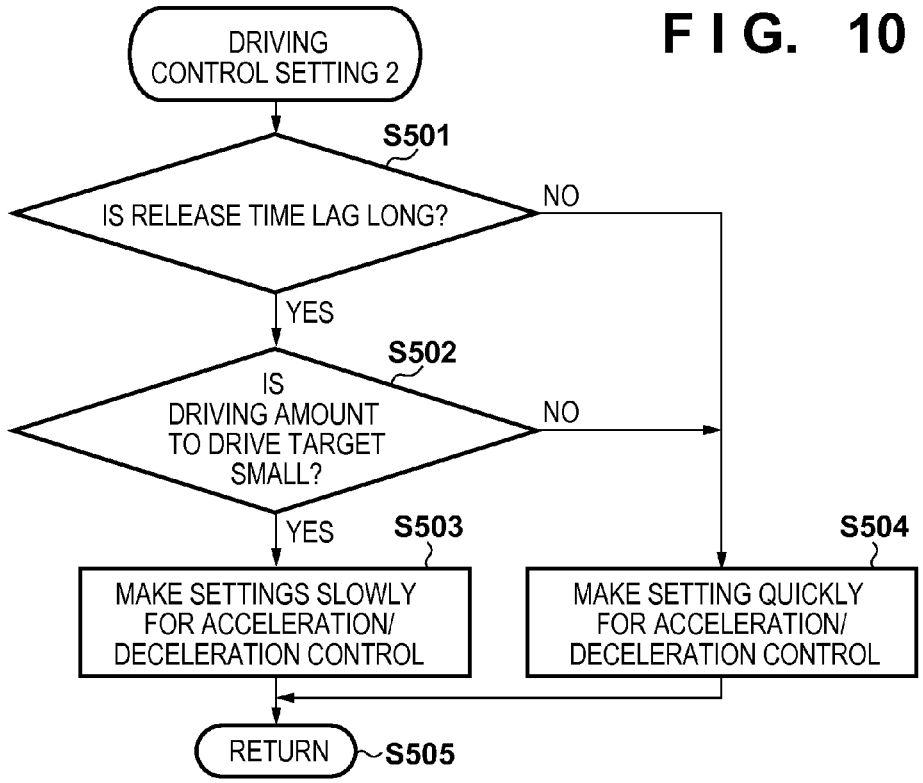
FIG. 10 is a flowchart showing settings in lens driving control on the lens side.

FIG. 10 is a flowchart showing a procedure for driving control setting 2 according to an embodiment of the present invention.

In step S501, the release time lag time obtained from the communication of "command: IS control" described above is determined. If the release time lag is longer than a predetermined time, the process advances to step S502; otherwise, the process advances to step S503.

In step S502, the driving amount of the focus lens up to the drive target is determined. If the driving amount of the focus lens is smaller than a predetermined value, the process advances to step S503; otherwise, the process advances to step S504. In step S503, settings are made slowly for acceleration/deceleration control on the focus lens. In step S504, settings are made quicker for acceleration/deceleration control on the focus lens than when the driving amount is smaller than the predetermined value. In step S505, the processing for driving control setting 2 is terminated.

Figure 11:
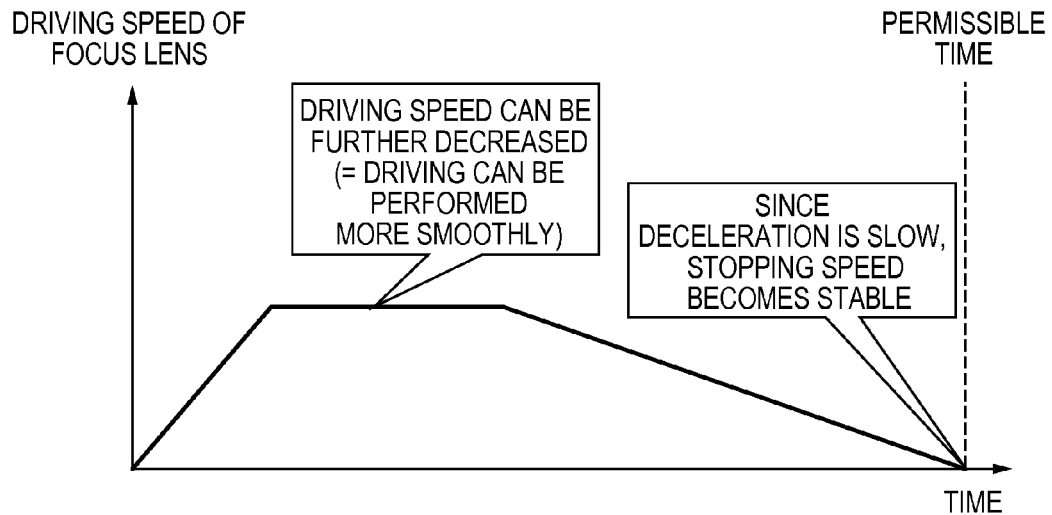
FIG. 11 is a graph for explaining a lens driving method in the ONE-SHOT mode.

FIG. 11 is a graph for explaining a case in which settings are made slowly for acceleration/deceleration control on lens driving. FIG. 11 is a graph representing the driving state of the lens when the drive target does not change in chronological order (NO in step S401) in the flowchart for driving control setting 1 in FIG. 9. This driving state is also applied to a case in which a driving amount to the drive target is small (YES in step S402) even though the drive target changes in chronological order (YES in step S401) in FIG. 9. Alternatively, the above driving state is applied to a case in which release time lag is long (YES in step S501) and a driving amount to the drive target is small (YES in step S502) in the flowchart for driving control setting 2 in the flowchart of FIG. 10.

Unlike in the related art, the lens itself determines whether a lens drive target has changed in chronological order, release time lag information, and a driving amount to the drive target. This allows the lens to decrease the driving speed of the focus lens to a necessary and sufficient speed. This makes it possible to shorten the stop time of the lens in intermittent driving, which more smoothly drives the focus lens, thereby implementing driving control on the focus lens that is suitable for following a moving object in AI-SERVO.

Figure 12:
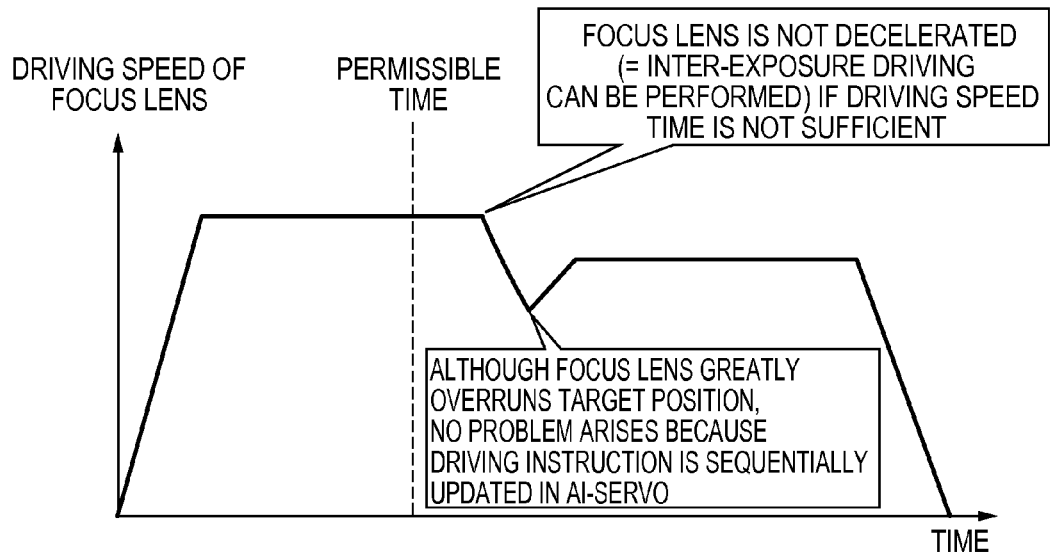
FIG. 12 is a graph for explaining a lens driving method in the AI-SERVO mode.
Figure 13:
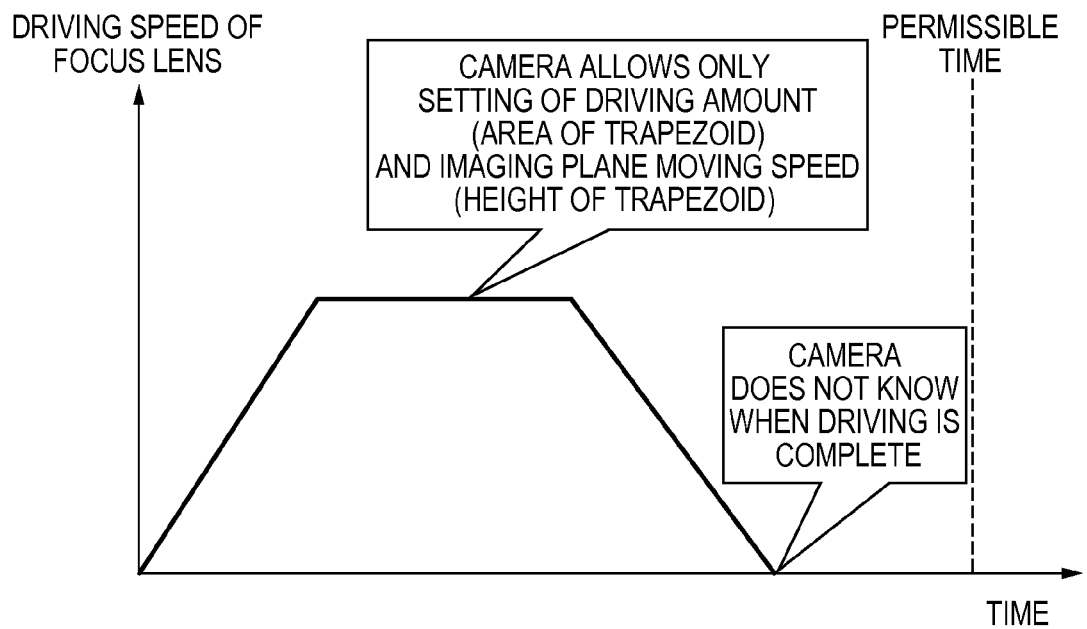
FIG. 13 is a graph for explaining a conventional lens driving method.

FIG. 12 is a graph for explaining a case in which settings are made quickly for acceleration/deceleration control on lens driving. FIG. 12 is a graph representing the driving state of the lens when the drive target has changed in chronological order (YES in step S401) and the driving amount to the drive target is large (NO in step S402) in the flowchart for driving control setting 1 in FIG. 9. This driving state is also applied to a case in which the release time lag is short (NO in step S501) or the release time lag is long (YES in step S501) and the driving amount to the drive target is large (NO in step S502) in the flowchart for driving control setting 2 in FIG. 10.

Unlike in the related art, the lens itself determines whether a lens drive target has changed in chronological order, release time lag information, and a driving amount to the drive target. This makes it possible to implement quick acceleration or deceleration, with higher priority being given to a driving time than to a stop position accuracy. In addition, it is possible to inhibit a decrease in the driving speed of the focus lens up to a target position, as needed. This makes it possible to drive the focus lens to the target position of the camera in the shortest distance.

In addition, in this driving control, the focus lens greatly overruns the initial target position of the camera. In the AI-SERVO mode, however, since the focus lens periodically receives driving instructions from the camera, the lens will never be located far from the final target stop position of the camera even without decelerating lens driving. In contrast to this, since it is possible to skip unnecessary deceleration processing, it is possible to implement driving control on the focus lens which is suitable for following an object moving at high speed in AI-SERVO.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-055616, filed Mar. 18, 2014, which is hereby incorporated by reference herein in its entirety.

What is claimed is:

1. A lens apparatus which is communicable with an image capturing apparatus and includes a focus lens, the lens apparatus comprising:
   at least one processor or circuit configured to perform the operations of the following units:
   a communication unit configured to periodically receive information concerning a driving amount of the focus lens; and
   a controller having a first mode and a second mode of controlling the focus lens,
   wherein said controller selects to control the focus lens by which one of the first mode and the second mode based on the received information concerning the driving amount of the focus lens and a driving permissible time of the focus lens, and
   wherein said controller makes at least one of an acceleration and a deceleration of the focus lens in the first mode slower than in the second mode, and
   wherein said controller controls the focus lens by the second mode when it is determined that if said controller controls the focus lens by the first mode and said controller cannot complete driving of the focus lens by the driving amount based on the received information within the driving permissible time, and
   wherein said controller controls the focus lens by the first mode when it is determined that if said controller controls the focus lens by the first mode and said controller can complete driving of the lens by the driving amount based on the received information within the driving permissible time.

2. The apparatus according to claim 1, wherein said controller selects one of the first mode and the second mode based on a change in driving amount of the focus lens which corresponds to the received information.

3. The apparatus according to claim 2, wherein when said controller selects the first mode, a change in driving amount of the focus lens which corresponds to the received information is smaller than when said controller selects the second mode.

4. The apparatus according to claim 1, wherein in the second mode, driving of the focus lens is controlled with higher priority being given to a driving speed of the focus lens than to a stop position accuracy of the focus lens.

5. The apparatus according to claim 1, wherein said controller calculates the driving permissible time of the focus lens from a plurality of driving amounts and a cycle of the reception based on the plurality of pieces of received information.

6. The apparatus according to claim 5, wherein said controller drives the focus lens to satisfy the driving permissible time of the focus lens.

7. The apparatus according to claim 5, wherein said controller decelerates a speed until the lens reaches a target position less when said controller cannot complete driving of the focus lens by a driving amount based on the received information within the driving permissible time than when said controller can complete driving of the focus lens by the driving amount based on the received information within the driving permissible time.

8. The apparatus according to claim 1, wherein if a time taken to move the focus lens as much as the driving amount of the focus lens based on the received information cannot satisfy a driving permissible time of the focus lens, the focus lens is not stopped even when the focus lens reaches a target position.

9. The lens apparatus according to claim 1, wherein said controller selects to control the focus lens by which one of the first mode and the second mode when a mode in which focus detection is periodically performed unless an AF (Auto-Focus) operation is completely turned off is selected.

10. An image capturing apparatus which is communicable with a lens apparatus including a focus lens and includes an image capturing unit the image capturing apparatus comprising:
    at least one processor OT circuit configured to perform the operations of the following units:
    a communication unit configured to periodically transmit information concerning a driving amount of the focus lens,
    wherein a controller of the lens apparatus has a first mode and a second mode of controlling the focus lens,
    wherein the controller selects to control the focus lens by which one of the first mode and the second mode based on the received information concerning the driving amount of the focus lens and a driving permissible time of the focus lens, and
    wherein the controller makes at least one of an acceleration and a deceleration of the focus lens in the first mode slower than in the second mode, and
    wherein said controller controls the focus lens by the second mode when it is determined that if said controller controls the focus lens by the first mode and said controller cannot complete driving of the focus lens by a driving amount based on the received information within the driving permissible time, and
    wherein said controller controls the focus lens by the first mode when it is determined that if said controller controls the focus lens by the first mode and said controller can complete driving of the lens by the driving amount based on the received information within the driving permissible time.

11. A method of controlling a camera system formed by attaching a lens which forms an object image to a camera, the method comprising:
    periodically communicating, to the lens, information concerning a driving amount of a focus lens by which a focus position of the lens is adjusted;
    determining whether or not a target position to be focused has changed with lapse of time based on the information concerning a plurality of driving amounts of the focus lens periodically communicated;
    controlling driving of the focus lens with higher priority being given to a stop position accuracy of the focus lens when the target position has not changed with lapse of time and controlling driving of the focus lens with higher priority being given to a driving speed of the focus lens when the target position has changed with lapse of time; and
    determining whether or not driving of the focus lens based on the information concerning the driving amount of the focus lens can be completed within the driving permissible time or not, if the focus lens is controlled by a first mode;
    wherein in the controlling, the focus lens is controlled by a second mode in which at least one of an acceleration and a deceleration of the focus lens is faster than in the first mode when it is determined that driving of the focus lens cannot be completed within the driving permissible time, and the focus lens is controlled by the first mode when it is determined that driving of the focus lens can be completed within the driving permissible time.

12. A non-transitory computer-readable storage medium storing a program for causing a computer to execute each step in a control method defined in claim 11.

* * * * *